Oct. 30, 1956 L. W. DROEL 2,769,035

MULTI-LINE TELEPHONE SYSTEM

Filed March 26, 1954 3 Sheets-Sheet 1

INVENTOR.
LOUIS W. DROEL
BY T. L. Bowes
ATTORNEY

Oct. 30, 1956 L. W. DROEL 2,769,035

MULTI-LINE TELEPHONE SYSTEM

Filed March 26, 1954 3 Sheets-Sheet 2

United States Patent Office 2,769,035

Patented Oct. 30, 1956

2,769,035

MULTI-LINE TELEPHONE SYSTEM

Louis W. Droel, Rochester, N. Y., assignor, by mesne assignments, to General Dynamics Corporation, a corporation of Delaware Application March 26, 1954, Serial No. 418,822

10 Claims. (Cl. 179—99)

My invention relates to telephone systems in which a plurality of lines from a switching office terminate at a subset or subsets, and more particularly to the means provided at each of the subsets for connecting the subset telephone to any one of the terminating lines.

In the past, multi-line telephone subsets suitable for use in the type of system contemplated in the above paragraph have been provided with means to make it possible for the user to connect at will the telephone handset associated with a multi-line subset to any one of a number of lines terminating at the subset and further means independent of the connecting means for placing a holding condition on a line so that the user could disconnect the telephone from the line by releasing the first mentioned means without releasing the connection established to that line at the distant end. The mechanism provided in these subsets made it necessary for the user to observe the precaution of carrying out the prescribed holding and hang-up operations in exact sequence in order to prevent the accidental release of or signalling to equipment at the distant ends of the lines terminated at the telephone subset.

Accordingly, it is an object of my invention to provide a new and improved subset suitable for connecting to and placing a holding condition on any one of a number of lines terminating at the subset.

Another object of my invention is to provide means in a subset for selectively connecting a telephone to any one of a number of lines terminating at the subset and means for automatically disconnecting the telephone from a selected line and establishing a holding condition on the selected line.

Another object of my invention is to provide a subset of the type described in the preceding object in which a previously established hold condition on a line is automatically removed upon connection of the telephone to that particular line.

Another object of my invention is to provide a subset of the type described in the preceding objects which automatically, upon the return of the telephone to its cradle, removes holding conditions from lines which have been placed in the holding condition.

In a system of the type contemplated, a plurality of lines from a central switching point is extended to a plurality of subscriber subsets. Each of these subsets is equipped with manually operable means for controlling the establishment of connections between the associated telephone and all of the lines, one connection at a time being possible. Manually operable holding means individual to each line capable of controlling the establishment of a holding condition on its associated line are also provided at each subset, the connecting and holding means being mechanically interlinked in such a way that operation of the holding means associated with any one line is effective to control the connecting means to open a connection between that line and the telephone in the event that such a connection has been established. The same linkage is also effective, in the event that a holding condition has been imposed on a line, to cause the holding controlling means to remove the holding condition responsive to the operation of the connecting means to establish a connection between the telephone and the particular line.

Each subset is equipped with a manually operable hookswitch mechanism, operable to disconnect the associated telephone from a portion of the subset circuit. Other mechanical linkage between the hookswitch mechanism and all of the holding means is provided in the subset and is effective to operate any holding means in the subset to remove the holding condition from the lines responsive to the hang up operation of the hookswitch, thereby preventing the subscriber from accidentally leaving a holding condition on a line on hanging up his telephone.

The system contemplated also provides for an interconnecting line to which the telephone of each subset may be connected. Control of the establishment of such a connection is had by manually operable means at each subset, which with the previously mentioned connecting means, is effective to control the completion of such a connection. Means comprising a mechanical linkage between the interconnecting controlling means and line connecting controlling means is provided to transfer the telephone from any line terminating at the subset to the interconnecting line responsive to manual operation of the interconnecting means. The last-mentioned linkage is also operative to cause the interconnecting means to open the connection between the telephone and the interconnecting lie responsive to the operation of the line connecting controlling means carried out to transfer the telephone from the interconnecting line to the line associated with any one line connecting means.

Further objects and advantages of my invention will become apparent as the following description proceeds and the features of novelty which characterize my invention will be pointed out with particularity in the claims annexed to and forming a part of this specification. For a better understanding of my invention, reference may be had to the accompanying drawings, of which Fig. 1 shows a three-quarter view of assembled telephone subset embodying the principle of my invention;

Figure 1:
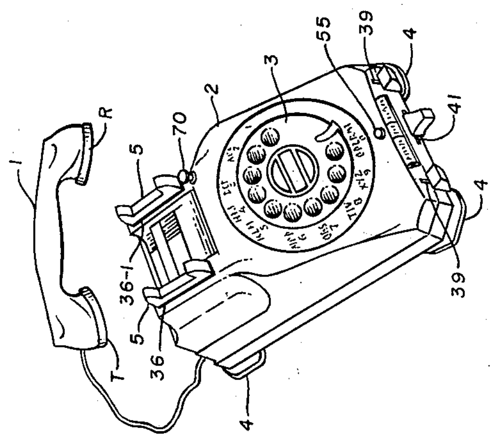

Referring to the drawings, each subset in the system consists of a telephone 1 comprising transmitter T and receiver R into which the subscriber speaks and to which he listens respectively, and a base portion comprising subset base 6 and the equipment which it carries, all of the base portion being covered by shell assembly 2.

Figure 6:
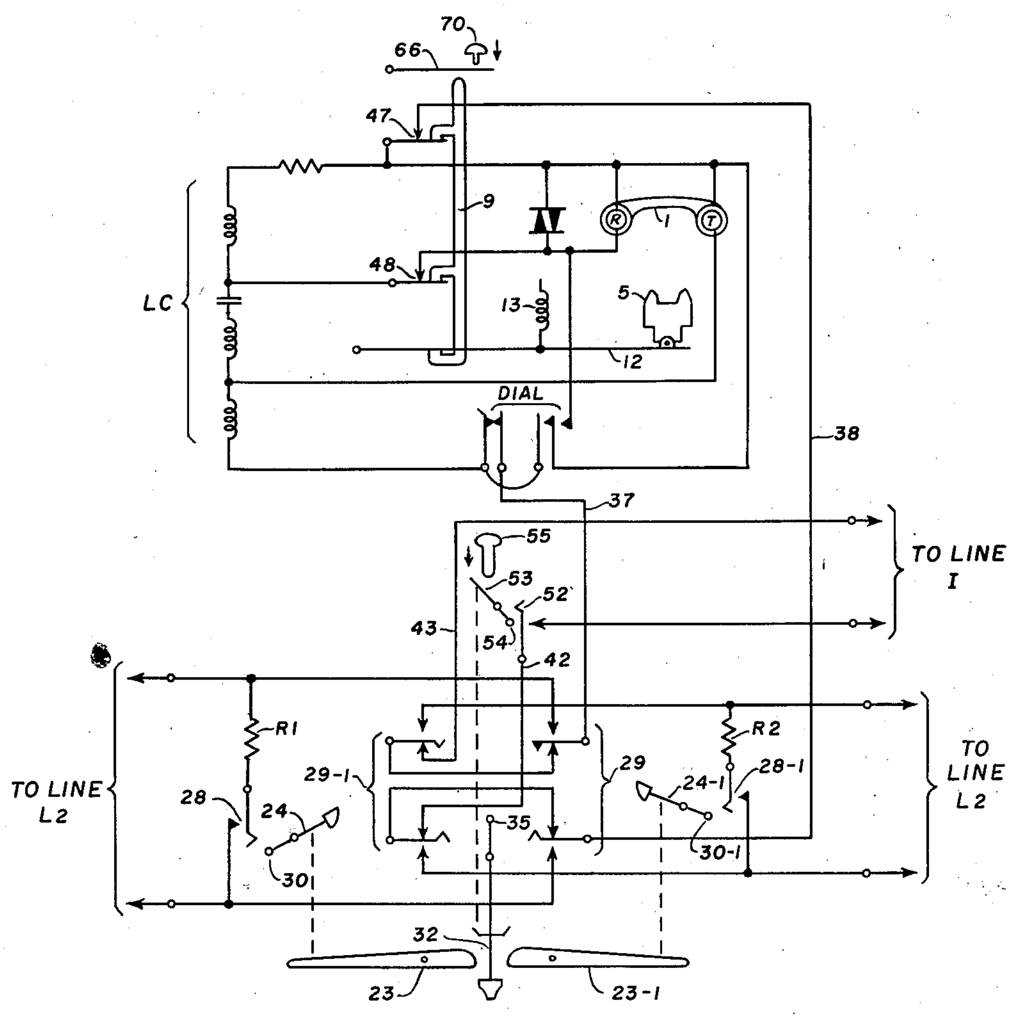
Fig. 6 is a schematic diagram of a typical subset suitable for use in the above-described system.

Referring to Fig. 6, means for controlling the connection of the transmitter T and receiver R of telephone 1 to the subset comprising hookswitch contacts 47 and 48 are provided in the base portion. Contacts 47 and 48 are arranged so that a connection between transmitter T and receiver R and conductors 37 and 38 of the circuit contained within the subset base portion is completed by way of induction coil LC as a result of closure of the contacts.

Figure 2:
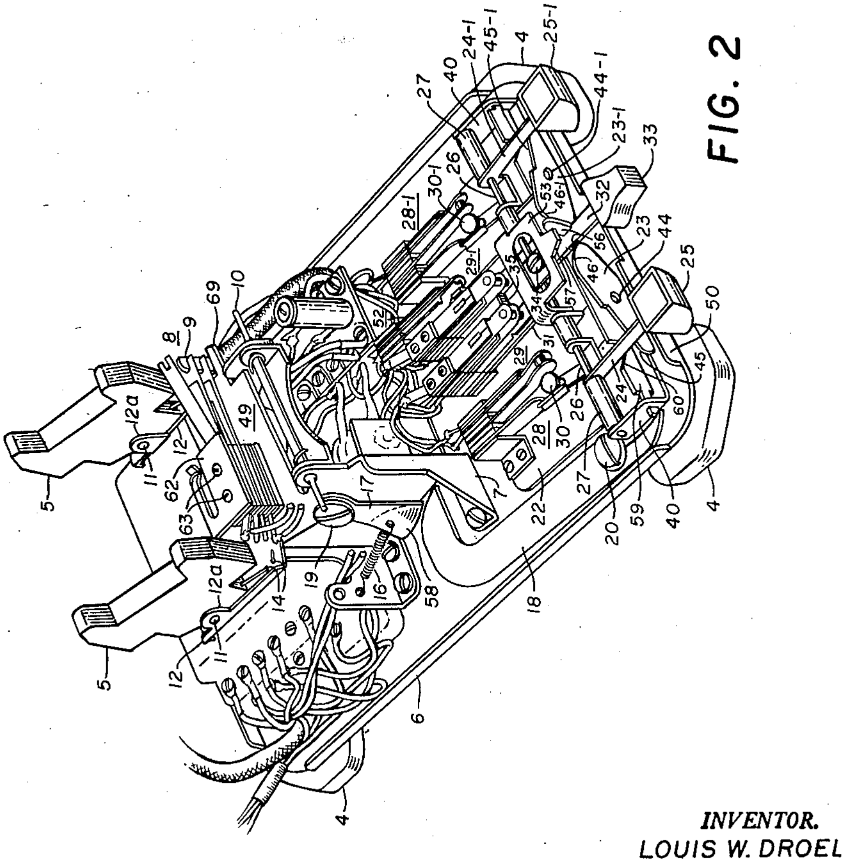
Fig. 2 is a three-quarter view of the subset of Fig. 1 with the shell and dial assemblies removed showing the multi-position connecting switch and the holding mechanism in relation to the hookswitch control mechanism.
Figures 3, 4:
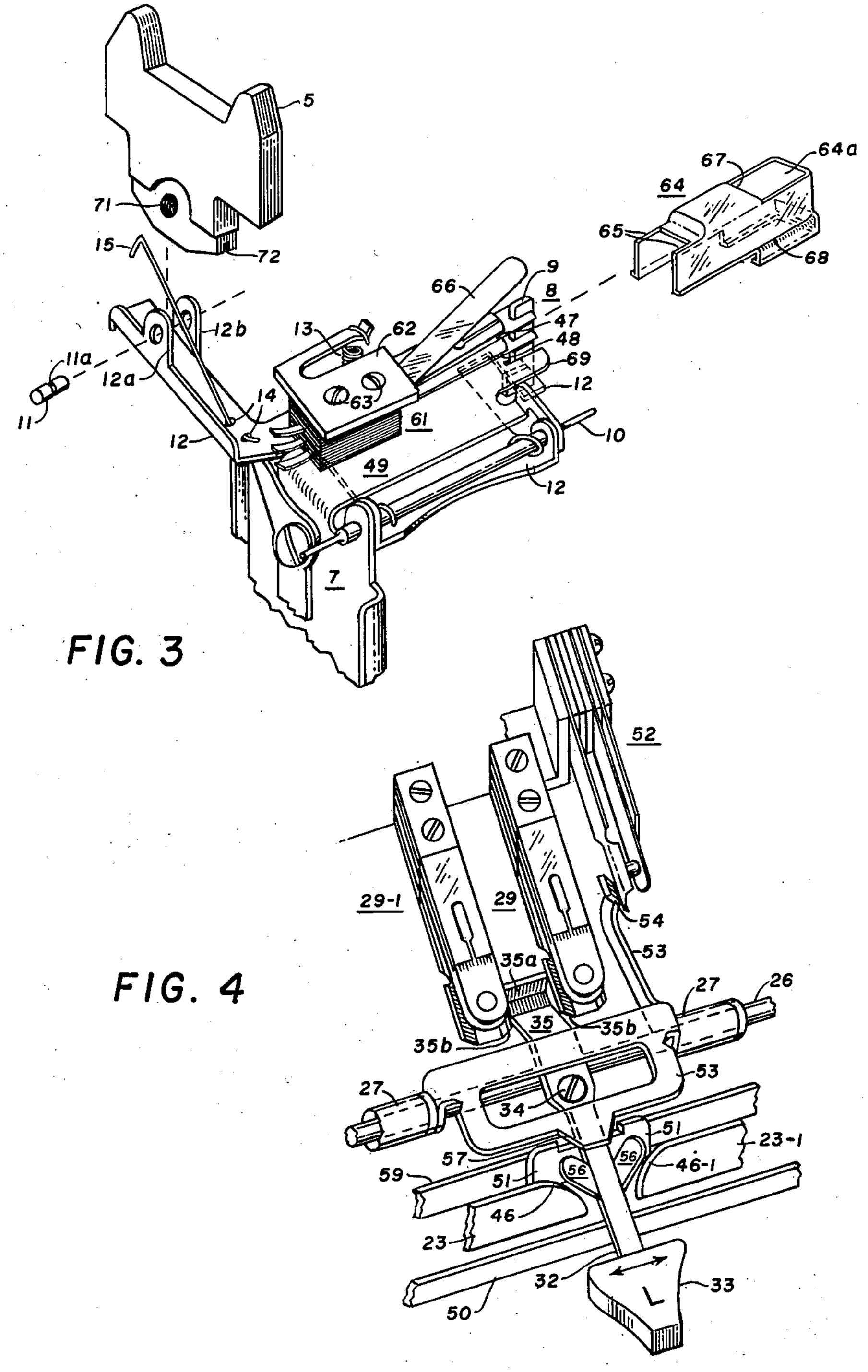
Fig. 3 is an exploded view of a portion of the subset shown in Fig. 2 showing details of the hookswitch control mechanism and its relationship to the cradle piece.
Fig. 4 is a view of a portion of the subset shown in Fig. 2 showing the details of the intercommunicating contact set control mechanism.

Referring to Figs. 2 and 3, contacts 47 and 48 are incorporated in spring stack 8 which is carried within the subset on the plate portion 49 of hookswitch support 7 which is in turn carried by base portion 6. The component springs of stack 8, all of which are fixed at one end and free to move at the other, are held physically and electrically separated from each other and from the subset at their fixed ends by insulating separator blocks. The assembled springs and separator blocks are compressed together and held against the plate portion 49 by means of clamping plate 62 which is urged toward the stack by means of screws 63. Clamping plate 62 overhangs the edges of stack 8 for reasons to be pointed out hereinafter.

Referring to the hookswitch springs as shown in Fig. 3, dust cover assembly 64 comprising a substantially rectangular shell covers the free end of the hookswitch contact stack 8. In order to position shell 64 with respect to stack 8, positioning means comprising the extensions 65 at one end of the shell which are received between mounting plate 49 and the previously mentioned overhanging portion of clamping plate 62 and slotted portions 68 at the other end of assembly 64 which embrace the extended portion 69 of plate 49 are provided. The shell assembly 64 is retained in its position relative to the stack by means comprising top spring 66 which emerges from the opening 64*a* in the top of assembly 64 and bears against surface 67 thereby urging assembly 64 inwardly toward the fixed end of contact stack 8.

Means for controlling the movement of the springs comprising pusher 9 is carried by a part of the springs at their free ends in stack 8, the latter springs being movable under the control of pusher 9, preferably made of insulating material, to close and open contacts 47 and 48 as pusher 9 is raised and lowered, respectively.

Manually operable means comprising lever 12 for controlling movement of pusher 9 (and, consequently, for controlling the hookswitch contacts 47 and 48) is pivotally or rotatably attached to support 7 by means of pin 10. Lever 12 in turn carries telephone receiving means comprising a pair of cradle pieces 5 which are pivotally attached to lever 12 by means of pins 11, each pin passing through axially aligned bores in spaced-apart ears 12*a* and 12*b* normal to lever 12 and through opening 71 through each cradle piece 5, the latter being positioned between ears 12*a* and 12*b*. The axes of the bores in ears 12*a* and 12*b* are also parallel to the axis of rotation of lever 12 about pin 10.

In order to retain pin 11 in position, a spring 15 is fixed to lever 12, as by being passed through holes 14 in lever 12, for example, and extends through slot 72 in engagement with annular groove 11*a* in pin 11, thereby preventing pin 11 from sliding along a line parallel to its own axis. The free end of spring 15 extends beyond cradle piece 5 and comprises means for manually depressing the spring to permit spring 15 to be moved out of engagement with pin 11 and thus permit efficient assembly and disassembly of the cradle piece 5 from hookswitch lever 12.

With shell 2 in its assembled position with respect to base 6, each of cradle pieces 5 passes through one of the pairs of openings 36 and 36–1 in shell 2 and is guided by the walls of the openings as lever 12 is rotated about pin 10.

A biasing spring 13 fixed at one end to clamping plate 62 and at the other end to lever 12 urges lever 12 to rotate upwardly about its axis of rotation during the time the telephone 1 is removed from cradle pieces 5. Referring to Fig. 6, contacts 47 and 48 are arranged to be closed when telephone 1 is removed from the cradle pieces 5 and lever 12 is in its upper position so that the above described connection between the telephone and the subset portion is completed and opened when the lever is moved downwardly against the tension of spring 13 by the weight of telephone 1 resting on cradle pieces 5 so that the above-described connection is broken.

As indicated in the preceding paragraphs, each subset in the contemplated system may be connected to any one of a plurality of lines comprising lines L1 and L2 which extend to terminals in the base of the subset. Again referring to Fig. 6, means for connecting the subset to lines L1 and L2 comprising contact sets 29 and 29–1 are carried within the subset portion. These contact sets each have normal and operated positions (conditions) and are wired in the well known series cut-off manner so that a connection from the subset conductors 37 and 38 is completed to conductors 42 and 43 by way of break portions of the contact sets when the latter are in their normal conditions, line L1 by way of the make portions of contact set 29 when the latter is in operated condition, and line L2 by way of the make portions of contact set 29–1 and the break portions of contact set 29 when the former only is in operated condition.

Mechanism for controlling the operation of contact sets 29 and 29–1 is provided in the subset portion at each subset in the system and is next described. Contact sets 29 and 29–1 are mounted on key plate 22 which is carried by base 6. Means comprising multiposition lever 32 is pivotally attached to key assembly plate 22 by vertical pin 34 and is provided for moving each of the contact sets 29 and 29–1, one at a time, between its normal and operated positions. Lever 32 is in normal position when it is at substantially right angles to the front edge 50 of base 6 and is movable in a horizontal plane to left and right of the normal position, the left and right positions constituting first and second operated positions, respectively, which correspond to lines L1 and L2, respectively. Stop 51 comprising a projection on key plate 22 limits the travel of lever 32 as the latter is moved away from its normal position to determine these operated positions. Member 35 carried by the end of lever 32 which lies within the subset portion cooperates with the bottom spring of each of contact sets 29 and 29–1 when the lever is moved to the first and second operated positions, respectively, to move the contact set associated with the line corresponding to the position to which lever 32 is moved from its normal to its operated position. The tension of the springs in any one contact set is operative to return each contact set to its normal position when lever 32 is moved to disengage member 35 from engagement with the bottom spring in that contact set. Member 35 is provided with a lateral portion 35*a* which cooperates with cam portions 35*b* of the bottom springs of contact sets 29 and 29–1 so that spring tension causes the lever to stay at rest following its movement to either operated position and after the moving force is removed from it, this being a variation of the so-called locking type key assembly.

Holding means comprising a shorting circuit for establishing a holding condition on each of the lines extending to one of the subsets are provided in each subset and are individually associated with each of the terminating lines. A plurality of these shorting circuits, each comprising a resistor and a set of contacts, such as R1 and contact set 28 which are associated with line L1, and resistor R2 and contact set 28–1 which are associated with line L2, are located in each subset of the system. Each such contact set has a normal and an operated position and is arranged to open and to complete the shorting circuit of which it is a part between the conductors of the one terminating line with which it is associated when it is in normal and operated positions, respectively.

Manually operable means comprising levers 24 and 24–1 are associated individually with and are individually operative for controlling each of the holding means. Shaft 26 which is carried by journalled ears 40 of key plate 22 is provided for pivotally carrying each of the hold levers so that cam members 30 and 30–1 carried by levers 24 and 24–1 respectively are brought into engagement with the springs of each of sets 28 and 28–1 to move the latter from their non-operated to operated positions when the hold keys 25 or 25–1 attached to the ends of levers 24 and 24–1 are moved from their upper or normal to their lower or operated positions. Tension of the springs in the sets is operative to return the contact sets to their normal positions when levers 24 and 24–1 are moved upwardly to their normal positions and members 30 and 30–1 are thereby disengaged from the springs of the contact sets with which they cooperate. Members 30 and 30–1 are so shaped that levers 24 and 24–1 tend to stay at rest in both normal and operated positions following the removal of driving force from the lever handle, this being a variation of the so-called locking type key.

First releasing means comprising cams such as 23 and 23–1 are individually associated with each of the above described holding means and holding controlling means as well as the one operated position of lever 32 which corresponds to the line with which each controlling means is associated. The purpose of each cam is to restore its associated holding means from the latter's operated to its normal position responsive to movement of lever 32 to the one operated position corresponding to the line with which the holding means is associated, thereby to remove automatically an existing holding condition from the line at the time that a connection is extended from the subset to the line with which an operated holding means and holding controlling means are associated; conversely, each cam is also operative to restore lever 32 from one of its operated positions to its normal position responsive to the movement of one of the holding levers to the latter's operated position when the holding lever is associated with the line to which the operated position of lever 32 corresponds, thereby to disconnect automatically the subset from a line responsive to the establishment of a holding condition on the same line. To these ends, cams 23 and 23–1 are pivotally carried by pins 44 and 44–1, respectively. With one of the holding levers such as 24 in its operated position, operation of lever 32 to the left into its first operated position (corresponding to line L1) causes the left-hand edge of lever 32 to engage surface 46 of cam 23 and forces the cam to move in a clockwise direction about pin 44. Surface 45 of cam 23 thereby is forced into engagement with the lower surface of hold lever 24 and drives the latter from its lower (operated) position to its upper (normal) position to move operating member 30 out of engagement with the outermost spring of contact set 28 so that the latter contact set is moved from its operated to its normal position to remove a holding condition from line L1 at the same time that lever 32 causes spring set 29 to be moved to its operated position to extend a connection from the subset to line L1. In the converse situation, i. e., when lever 32 is in one of its operated positions such as the first to cause the extension of a connection from the subset to line L1, depressing hold lever 24 which is associated with line L1 by operating key 25 to its operated position places a holding condition on that line as previously explained, and, at the same time, drives the lower surface of lever 24 into engagement with surface 45 of cam 23, causing the cam to rotate in a counterclockwise direction and forces cam surface 46 into engagement with lever 32 to drive lever 32 from the latter's first operated to the right to its normal position thereby moving contact set 29 from its operated to its normal position to disconnect conductors 37 and 38 of the subset from line L1 at the same time that a holding condition is placed on the same line. While the above description of the first releasing means has been confined to the apparatus associated with line L1 it is pointed out that the first releasing means associated with line L2 functions in a similar manner.

In order to provide for automatically releasing the holding condition from any one of the lines established at a subset in the contemplated system upon return of the telephone to its hookswitch, second releasing means comprising mechanical linkage between hookswitch lever 12 and the holding controlling means comprising levers 24 and 24–1 is provided. As previously described, return of the telephone 1 to hookswitch cradle 5 is operative to depress lever 12 and thereby open hookswitch contacts 48 to disconnect transmitter T and receiver R from the subset and, consequently, from any line to which the subset has been connected. This linkage comprises first and second linkage levers 17 and 18, respectively, and release bar 59. Depressing lever 12 to disconnect telephone 1 is effective to move the first linkage lever 17 about pivot pin 19 which is fixed to hookswitch contact support 7; the movement of flared end 58 on first lever 17 engages and moves second lever 18 which is pivotally attached to the base 6 of the subset by means of pin 20. Ears 40 on plate 22 are provided with slots which slidably receive release bar 59 which is moved to the right, as viewed in Fig. 2, responsive to the movement of levers 17 and 18 when the hookswitch lever 12 is depressed. Slanting cam surfaces 60 of the hookswitch bar provided as part of suitable notches on release bar 59 engage hold levers 24 and 24–1 to move the latter from their operated to their non-operated positions thereby restoring hold spring contact sets 28 and 28–1 to their normal positions. Restoration of contact sets 28 and 28–1 as described above removes hold conditions from lines L1 and L2 that existed prior to the above described hang up operation carried out by the subscriber.

On removal of telephone 1 from cradle pieces 5, lever 12 is moved upwardly under the urging of spring 13 as previously described to allow first linkage lever 17 to be retracted from the position to which it was moved by depressing lever 12 and is kept in contact with lever 12 by the urging of helical bias spring 16. This movement of lever 17 also serves to disengage the flared portion 58 of lever 17 from linkage lever 18 and thereby make easier the movement of release bar 59 the left as viewed in Fig. 2 responsive to the depression of either or both of holding controlling levers 24 and 24–1 to their operated positions when the latter come into engagement with slanting surface 60 of release bar 59.

In a system of the type contemplated, it is also desirable to provide at each subset means for sending flashing supervision on the line to which the subset is connected. Ordinarily, hookswitch contacts 47 and 48 controlled by cradle pieces 5 and lever 12 flashed by the subscriber's operation would be sufficient to carry out this flashing function; however, this is not practical in a system using a subset having the above-described features, since operation of the hookswitch for flashing purposes is also operative to release a holding condition established at the same subset on another line. Thus, it is necessary to provide suitable means for normally operating hookswitch contacts 47 and 48 which is independent of the hookswitch mechanism.

Such auxiliary hookswitch contact control means comprising topmost spring 66 of the spring stack 8 extending through the opening *64a* in dust cover assembly 64 and flashing plunger 70, which is in turn carried by shell assembly 2, and positioned to engage spring 66 is provided to move spring 66 against the upper end of pusher 9, which in turn drives the springs in stack 8 in the same manner that they are driven by hookswitch control lever 12, to disconnect transmitter T and receiver R of telephone 1 from conductors 37 and 38 of the subset, and thereby open the short comprising transmitter T between the conductors of the line to which the subset is connected.

To make it possible to connect any one subset in the system to intercommunicating line I, intercommunicating connecting means comprising contact set 52, in combination with previously described line connecting means in the same subset, is provided for controlling the completion of a connection between the intercommunicating line I and conductors 37 and 38 of the subset. Contact set 52 and each of the line connecting means comprising break portions of contact sets 29 and 29–1 jointly control the connection of conductors 37 and 38 to line I by way of conductors 42 and 43 within any one subset.

Means for controlling contact set 52 comprising lever 53 is pivotally carried on shaft 26. Operating member 54 carried on the end of level 53 is out of engagement with the innermost spring of contact set 52 and the latter is then in normal condition (contacts open) when member 53 is in the lower of its two positions as a result of lever 53 being in its normal position. When lever 53 is moved to its operated position responsive to manually depressing further controlling means comprising plunger 55, which is carried by the shell assembly 2, member 54 is raised to engage the innermost spring of contact set 52 to drive the contact set to its operated position and thereby close the contacts in that set. The operating member 54 and the innermost spring of set 52 with which member 54 cooperates are so shaped that the springs are held in either normal or operated position following the movement of lever 53 and after the moving force has been removed from lever 53, this being a variation of the so-called locking type key assembly.

Ears 56 carried by lever 53 are used as linkage between levers 32 and 53 to engage lower edges 57 of lever 53 as the latter is moved from its non-operated to its operated position to force lever 32 to be moved from either of its operated positions to its normal position, thereby restoring either operated line connecting means to normal position, to automatically transfer conductors 37 and 38 from their connection with either line L1 or L2 into connection with conductors 42 and 43 of the subset responsive to manual operation of lever 53 from its normal to its operated position. Conversely, ears 56 engage lower edges 57 of operated lever 53 as lever 32 is moved from its non-operated position to either of its operated positions to force lever 53 to move from its operated to non-operated position thereby causing contact set 52 to return to its normal position to open the connection between intercommunicating line I and the subset as represented by conductors 42 and 43 at the same time that conducors 37 and 38 are transferred from their connection to line I to either line L1 or L2, responsive to the operation of lever 32 as previously explained.

Figure 5:
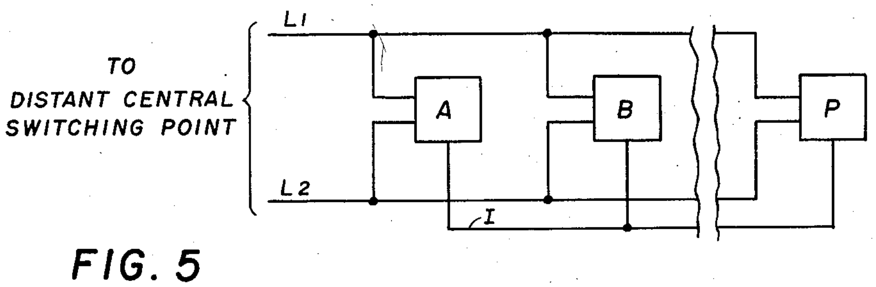
Fig. 5 is a single line schematic showing the arrangement of a plurality of a number of subsets in relation to a plurality of lines terminating at those subsets.

In the system contemplated which is schematically shown in Fig. 5, a number of lines having distant ends which terminate at a central switching point (not shown), extend to each of a plurality of subsets such as A, B, and P, which are identical to the subset described above. A subscriber at any one of the subsets connects his telephone to either of the lines L1 or L2 operating the manually controllable lever 32 as previously described. This same subscriber can, as he sees fit, place a hold condition on any or all lines terminating at his subset during the time that the telephone is lifted from the subset's cradle pieces and thereby automatically disconnect his telephone from the lines at the same time by placing the hold lever (24 or 24–1) associated with said any or all lines in its operated condition, as for example, by depressing one or both of levers 24 and 24–1.

When none or either of lines L1 or L2 has been placed in hold condition at his subset, the subscriber may connect his telephone to the other line by further operation of lever 32. Should the subscriber want to send flashing supervisory signals over the line to the central switching point, he does so by operating flashing plunger 70 to open contacts 47 and 48 of the hookswitch contact assembly without causing the release of holding control levers 24 and 24–1 due to operation of the mechanical linkage which is controlled by and operative responsive to the operation of the hookswitch lever in the manner described above.

Signalling from the central switching point to the subsets in the present system is accomplished in any one of a number of ways which are not shown and because they are not a part of the present invention such as by the application of ringing voltage to the line at the distant end to operate audible signals that may be attached to lines L1 and L2 at any or all of the subsets in the system, to indicate to the subscriber or subscribers when incoming calls are standing in the lines.

If the subscriber should desire to establish a connection to another one of the subsets in the system by way of intercommunicating line I which is independent of lines L1 and L2, he does so by depressing the intercommunicating plunger 55 as previously described, thereby automatically transferring the telephone of the subset from the line L1 or L2 to which had been connected intercommunicating line I to which all subsets in the system have access. The subscriber signals the subset to which he wishes to talk by means not shown, and which are not a part of the present invention.

When the subscriber hangs up his phone, the previously described linkage between the hookswitch and the holding mechanism is rendered operative to remove holding conditions that have been placed on any lines at the particular subscriber's subset, thereby freeing the line for further use.

While in the system contemplated only two lines are shown terminating at each subscriber's subset, it is understood that my invention is equally effective when provision is made at each of the subsets in the system for terminating more than two lines. While increasing the number of terminating lines would necessitate the use of a somewhat different multi-position connecting mechanism, the principles involved in such a new machanism would be the same as the ones described above.

The structural details of the cradle and hookswitch assembly are not part of the present invention, but are disclosed and claimed in the copending application of Louis W. Droel, Serial No. 283,942, filed April 23, 1952, and assigned to the same assignee as the present invention.

While I have shown and described my invention as applied to a specific embodiment thereof, other modifications will readily occur to those skilled in the art. I do not, therefore, desire my invention to be limited to the specific arrangement shown and described, and I intend in the appended claims to cover all modifications within the spirit and scope of my invention.

What is claimed is:

1. In telephone apparatus, a subset including a telephone, a plurality of lines terminating at said subset, connecting means in said subset individual to each of said lines for closing and opening a connection between each of said lines and said telephone, first controlling means in said subset for controlling said connecting means, holding means in said subset individual to each of said lines for establishing a holding condition on each of said lines, second controlling means individual to each of said holding means for causing said holding means to establish a holding condition on any one of said lines, and releasing means individual to and operable by said second controlling means for operating said first controlling means thereby effecting the release of said first connecting means to disconnect said any one line from said telephone.

2. In telephone apparatus, a subset including a telephone, a plurality of lines terminating at said subset, connecting means in said subset individual to each of said lines for closing and opening a connection between each of said lines and said telephone, first controlling means in said subset for controlling said connecting means, means in said subset for establishing and removing a holding condition on each of said lines, second controlling means individual to each of said holding means for causing said holding means to establish a holding condition on any one of said lines, and releasing means individual to said second controlling means and operable by said first controlling means for operating said second control means thereby effecting the release of said holding means to remove a holding condition from said any one line.

3. In telephone apparatus, a subset including a telephone, a plurality of lines terminating at said subset, connecting means in said subset individual to each of said lines for closing and opening a connection between each of said lines and said telephone, first controlling means in said subset for controlling said connecting means, means in said subset individual to each of said lines for controlling the establishment of a holding condition on each of said lines, second controlling means individual to each of said holding means for causing said holding means to establish a holding condition on any one of said lines, and releasing means individual to and operable by said second controlling means for operating said first controlling means thereby effecting the release of said first connecting means to disconnect said telephone from said any one line and operable by said first controlling means for operating said second controlling means thereby effecting the release of said holding means to remove a holding condition from said any one line.

4. The telephone apparatus of claim 3 wherein said subset includes hookswitch contacts for controlling the extension of a connection between said telephone and said subset, means for controlling said hookswitch contacts, and other releasing means in said subset for moving said second controlling means operative responsive to operation of said hookswitch controlling means thereby effecting the operation of said holding means to remove holding conditions from all of said lines.

5. In telephone apparatus, a plurality of subsets each including a telephone, a plurality of lines extending to each of said subsets, connecting means in each of said subsets individual to each of said lines for opening and closing a connection between any one of said lines and said telephone of any one of said subsets, a single, first controlling means in each of said subsets movable to a plurality of positions each of which corresponds to one of said lines for causing said connecting means individual to said any one line to close a connection to said telephone of said any one subset responsive to movement of said first controlling means of said any one subset to said position corresponding to said any one line, holding means in each of said subsets individual to each of said lines for establishing and removing a holding condition on said line to which it is individual, second controlling means individual to each of said holding means and each of said lines movable between first and second positions for causing said holding means individual to said any one line to remove a holding condition on said any one line responsive to movement of said second controlling means individual to said any one line from said second to said first position, releasing means individual to each of said second controlling means for restoring said second controlling means individual to said any one line in said any one subset from said second to said first position responsive to movement of said first controlling means in said any one subset to said position corresponding to said any one line, whereby a holding condition established at said any one subset on said any one line is removed responsive to movement of said first controlling means to establish a connection between said telephone of said any one subset and said any one line.

6. In telephone apparatus, a plurality of subsets each including a telephone, a plurality of lines extending to each subset, connecting means in each subset individual to each of said lines for opening and closing a connection between any one of said lines and said telephone of any one of said subsets, a single, first controlling means in each of said subsets movable to a plurality of operated positions, each of which corresponds to one of said lines, and a normal position for causing said connecting means individual to said any one line to open a connection to said telephone of said any one subset to said any one line responsive to movement of said first controlling means of said any one subset from said position corresponding to said any one line to said normal position, holding means in each of said subsets individual to each of said lines for establishing and removing a holding condition on said line to which it is individual, second controlling means individual to each of said holding means and each of said lines movable between first and second positions for causing the said holding means individual to said any one line to establish a holding condition on said any one line responsive to movement of said second controlling means individual to said any one line from said first to said second position, releasing means individual to each of said second controlling means for restoring said first controlling means in said any one subset from said position corresponding to said any one line to said normal position responsive to movement of said second controlling means individual to said any one line from said first to said second position, whereby a connection between said telephone of said any one subset and said any one line is opened responsive to movement of said second controlling means to establish a holding condition on said any one line.

7. In telephone apparatus, a plurality of subsets each including a telephone, a plurality of lines extending to each of said subsets, connecting means in each of said subsets individual to each of said lines for opening and closing a connection between any one of said lines and said telephone of any one of said subsets, a single, first controlling means in each of said subsets movable to a plurality of operated positions, each of which corresponds to one of said lines, and a normal position for causing said connecting means individual to said any one line to close and open a connection between said telephone of said any one subset and said any one line responsive to movement of said first controlling means of said any one subset from and to, respectively, said position corresponding to said any one line, holding means in each of said subsets individually to each of said lines for establishing and removing a holding condition from said line to which it is individual, second controlling means individual to each of said holding means and each of said lines movable between first and second positions for causing said holding means individual to said any one line to establish and remove a holding condition therefrom responsive to movement of said second controlling means individual to said any one line from said first to said second position and from said second to said first position, respectively, releasing means individual to each of said second controlling means for restoring said first controlling means in said any one subset from said position corresponding to said any one line to said normal position responsive to movement of said second controlling means individual to said any one line from said first to said second position, and for restoring said second controlling means in said any one subset and individual to said any one line from said second to said first position responsive to movement of said first controlling means in said any one subset to said position corresponding to said any one line, whereby a connection between said telephone of said any one subset and said any one line is opened responsive to movement of said second controlling means to establish a holding condition on said any one line and a holding condition is removed from said any one line responsive to movement of said first controlling means to establish a connection between said telephone of said any one subset and said any one line.

8. The telephone apparatus of claim 7 wherein each of said subsets includes hookswitch contacts for further controlling the opening and closing of a connection between said any one subset and said included telephone, means for controlling said hookswitch contacts, and other releasing means for moving said second controlling means responsive to operation of said hookswitch controlling means whereby said second controlling means are moved from said second to said first position when said hook-switch contact controlling means is operated to disconnect said telephone of said any one subset from said any one line.

9. In telephone apparatus, a plurality of subsets each including a telephone, a plurality of lines extending to each of said subsets, connecting means in each of said subsets individual to each of said lines for opening and closing a connection between any one of said lines and said telephone of any one of said subsets, a single, first controlling means in each of said subsets movable to a plurality of operated positions, each of which corresponds to one of said lines, and a normal position for causing said connecting means individual to said any one line to close and open a connection to said telephone of said any one subset responsive to movement of said first controlling means to and from, respectively, said operated position corresponding to said any one line, an intercommunicating line extending to each of said subsets, intercommunicating connecting means in each of said subsets, said connecting means and said interconnecting means jointly controlling the closing and opening of a connection between said intercommunicating line and said telephone of said any one subset, second controlling means in each of said subsets individual to said intercommunicating connecting means movable between a non-operated and an operated position for controlling said intercommunicating connecting means and for moving said first controlling means from one of said operated positions corersponding to said any one line to said normal position responsive to movement of said second controlling means from said non-operated to said operated position whereby the connection of said telephone of said any one subset is transferred from said any one line to said intercommunicating line responsive to operation of said second controlling means from said non-operated to said operated position.

10. In telephone apparatus, a subset including a telephone, a plurality of lines terminating at said subset, means comprising first spring set having normal and operated positions individual to each of said lines for controlling the extension of a connection between the line to which said spring set is individual and said telephone, means comprising a manually operable first lever in said subset having a normal position and a plurality of operated positions, each of which corresponds to one of said lines and one of said first spring sets, for moving said first spring set individual to any one of said lines to said operated position whereby a connection is completed between said telephone and said any one line responsive to movement of said first lever to the one of said operated positions corresponding to said any one line, means comprising a second spring set having normal and operated positions individual to each of said lines and each of said first spring sets for controlling the establishment of a holding condition on each of said lines, means comprising a manually operable second lever having a normal and an operated position individual to each of said second spring sets and the latter's individual line for moving the individual said second spring set between said normal and said operated positions whereby a holding condition is placed on said any one line responsive to movement of the one of said second levers individual to said any one line from said normal to said operated position, means comprising a third lever individual to each of said second levers for restoring its individual said second lever from said operated to said normal position responsive to movement of said first lever to the one of said operated positions corresponding to the line with which said second lever is individual and for restoring said first lever from the one of said operated positions corresponding to said any one line to said normal position responsive to the operation of said second lever individual to said any one line from said normal to said operated position whereby a holding condition on any one of said lines is removed responsive to the establishment of a connection between said telephone and said any one line and a connection between said telephone and said any one line is opened responsive to the establishment of a holding condition on said any one line.

References Cited in the file of this patent

UNITED STATES PATENTS

| | | |
|---|---|---|
| 1,956,360 | Obergfell | Apr. 24, 1934 |
| 2,040,311 | Horn et al. | May 12, 1936 |
| 2,361,880 | Shann | Oct. 31, 1944 |
| 2,580,105 | Krumreich | Dec. 25, 1951 |

OTHER REFERENCES

Automatic Electric Review, vol. 4, No. 1, March 1935, page 3.